Patented Jan. 31, 1950

2,496,151

UNITED STATES PATENT OFFICE 2,496,151

AZO DYESTUFFS

Charles R. Dawson, New York, and David Wasserman, Brooklyn, N. Y., assignors, by mesne assignments, to The Harvel Corporation, a corporation of New Jersey No Drawing. Application August 14, 1946, Serial No. 690,596

1 Claim. (Cl. 260—206)

This invention relates to novel compositions of matter and to novel methods as well as to steps in the methods for producing them. In its more specific aspect this invention is directed to novel azo compounds and to novel methods and to steps in the methods for producing them. This application is a continuation in part of our copending application executed on the 25th day of July, 1946, bearing Serial No. 687,524 and filing date of July 31, 1946, and made part hereof.

According to this invention, we produce novel azo compounds by using as a starting material a readily available product known as hydrogenated cardanol consisting essentially of 3-pentadecyl phenol. We have discovered that this compound may be coupled readily and easily with any diazotized aromatic primary amine to provide a wide variety of novel azo compounds. The following compounds when diazotized are examples of aromatic primary amines: Aniline, sulfanilic acid, ortho-, meta- and para-toluidine, anisidene, phenyldiamine, chloro-, bromo- and iodo-aniline, α- and β-naphthylamine and naphthylamine sulfonic acids.

The 3-pentadecyl phenol having the following formula

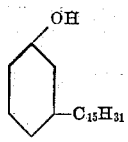

may be readily obtained by hydrogenating only the unsaturated side chain of cardanol or by hydrogenating cashew nut shell liquid and then separating this compound from the other components of the hydrogenated cashew nut shell liquid. The manner for production of this compound is disclosed in our hereintofore identified application and also in the patent to S. Caplan No. 2,181,119 issued on November 28, 1939.

The 3-pentadecyl phenol may be coupled with a diazotized aromatic primary amine either under slightly acid, slightly alkaline or neutral conditions whereupon the aromatic ring of the 3-pentadecyl phenol becomes attached directly to the —N=N— group of the diazo reactant. When the coupling is carried out under alkaline conditions, either an inorganic or organic alkali may be employed. In practice we prefer to employ a metal hydroxide such as potassium hydroxide or sodium hydroxide although any of the other inorganic alkalis may be used.

The following examples are set forth merely to illustrate the invention which is not to be limited thereby.

Example 1

A mixture of 52.5 grams of sulfanilic acid dihydrate and 14 grams of potassium hydroxide in 200 cc. of water was cooled to 15° C. Meanwhile, a solution of 18.5 grams of sodium nitrite in 50 cc. of water was prepared and then added to the first solution. The resultant solution was poured rapidly into 53 cc. of concentrated hydrochloric acid and 250 grams of ice in an ice-salt water bath, stirring vigorously at all times to keep the temperature at 0° C.–5° C. The resulting mixture containing diazotized sulfanilic acid.

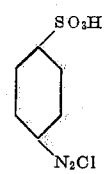

was stirred at 0° C. for about 15 to 20 minutes while preparing the next solution.

The solution of 75 grams of 3-pentadecyl phenol dissolved in 39 grams of potassium hydroxide in 500 cc. of 95% ethanol was placed in a 3-liter 3-neck flask and cooled to 0° C.–5° C. by means of an ice salt water bath. The aforesaid mixture containing the diazotized sulfanilic acid was filtered wet, and the diazotized sulfanilic acid was then resuspended in ethanol at 0° C. and subsequently this suspension was slowly added to said alcoholic alkaline solution of the 3-pentadecyl phenol at 0° C. whereupon coupling of the diazotized sulfanilic acid with said 3-pentadecyl phenol took place resulting in the production of a novel red azo dye solution. The red solution containing the resultant azo compound was stirred for two hours at 10° C. to increase the yield of the azo compound. The reaction occurs as follows:

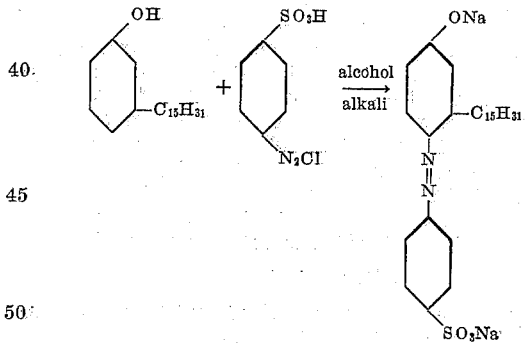

The sodium salt of 4-sulfo 3'-pentadecyl 4' hydroxy azo benzene was obtained from the red reaction mixture at the end of the reaction by acidifying the mixture with concentrated HCl to faintly acid and then restoring a faint alkalinity, pH 8, by addition of a slight excess of sodium bicarbonate. Upon the addition of an equal volume of saturated sodium chloride solution and cooling, the solid monosodium salt settles out.

The orange precipitate was filtered, and dried in a vacuum oven at 60° C. at 15 mm. pressure. The orange powder was soluble in water, methanol and ethanol, insoluble in saturated salt solution and only slightly soluble in acetone.

The free acid was obtained from the original mixture by pouring the mixture into an excess of dilute hydrochloric acid solution with stirring. The resultant orange precipitate was centrifuged, washed with dilute hydrochloric acid and dried by evaporation on the steam bath. The resultant brown solid was found to be soluble in ethanol and dioxane, slightly soluble in acetone and insoluble in water, "Skelly" solvent B or D, benzene, and ethyl acetate.

*Example 2*

In a 2-liter 3-necked flask was placed 84.5 grams of 3-pentadecyl phenol and 48.6 grams of potassium hydroxide in 200 cc. of 95% ethanol.

The diazonium solution was prepared by placing 25.6 grams of aniline, 74.4 grams of concentrated hydrochloric acid, enough water to dissolve the hydrochloride, and 150 cc. of ethanol in a 1-liter beaker. A concentrated solution of 20 grams of sodium nitrite in 100 cc. of 50% ethanol, at 0° C. was added below the surface of the amine solution, keeping the temperature below 0° C. by means of an ice-salt bath. The nitrite was added until a positive test with starch iodide test paper was indicated.

To the alkaline solution of the phenol in the flask was added the alcoholic benzene diazonium chloride solution at 0° C.–10° C. below the surface of the first solution, with efficient stirring for about 2 hours to produce a novel azo dye. The reaction proceeded as follows:

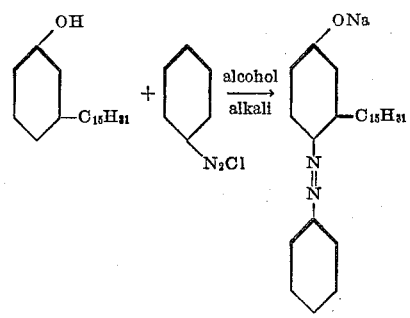

The dye resulting in this case was isolated by pouring the reaction mixture into water. The red solid that separated was centrifuged, washed and vacuum dried. It was found to be soluble in hydrocarbon solvents derived from petroleum and boiling between 40–60° C., such as pentane, and also the hydrocarbon solvents derived from petroleum and boiling between 90–110° C., such as heptane, slightly soluble in benzene, and insoluble in acetone, methanol and ethanol in the cold. It was soluble in all at their boiling points.

*Example 3*

Di-anisidine may be diazotized and then coupled with 3-pentadecyl phenol to provide a novel red azo dye.

The novel azo dyes of Examples 1–3 may be subjected to reductive cleavage for example as set forth in our afore-referred to application to provide 4-amino-3-pentadecyl phenol which may be diazotized and then coupled with 3-pentadecyl phenol under alkaline conditions to provide a novel yellow-orange azo dye having the following general formula:

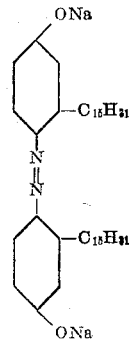

If the pH of any of the systems after coupling is alkaline due to the presence of a metal hydroxide, the hydrogen of the OH of the phenol is replaced by the metal of the hydroxide and this hydrogen may be restored by adding a strong acid to the system in amount sufficient to render the system acid. In like manner when the system is neutral after coupling, the OH of the phenol is present and the hydrogen thereof may be replaced by a metal by adding a metal hydroxide thereto in amount sufficient to render the system alkaline.

The novel azo compounds of the present invention may be used as dyes and pigments or as intermediates in the preparation of other compounds as set forth in our copending application.

Having thus described our invention, what we claim and desire to protect by Letters Patent is:

An azo compound being diazotized 4-amino-3-pentadecyl phenol coupled with 3-pentadecyl phenol.

CHARLES R. DAWSON.
DAVID WASSERMAN.

REFERENCES CITED

The following references are of record in the file of this patent:

UNITED STATES PATENTS

| Number | Name | Date |
| --- | --- | --- |
| 1,281,243 | Ehrhardt et al. | Oct. 8, 1918 |
| 2,034,668 | Reindel et al. | Mar. 17, 1936 |
| 2,127,478 | Crossley | Aug. 16, 1938 |
| 2,181,119 | Caplan | Nov. 28, 1939 |
| 2,266,413 | Crossley | Dec. 16, 1941 |
| 2,302,530 | Crossley | Nov. 17, 1942 |
| 2,393,652 | Olpin | Jan. 29, 1946 |

OTHER REFERENCES

Chem. Abst., vol. 36, 1942, page 4486.
Citing T. N. Mehta, J. Indian Chem. Soc. Ind. & News Ed., vol. 4, pages 170–4 (1941).

Wasserman & Dawson, Industrial & Engineering Chemistry, April 1945, pages 396–99.

Harvey & Caplan, Industrial & Engineering Chemistry, vol. 32, Oct. 1940, pages 1306–10.

Naidu, Jrl. Ind. Inst., vol. 8A, part 9, 1925 (page 138).